United States Patent
Yoda (10) Patent No.: US 12,381,986 B2
(45) Date of Patent: Aug. 5, 2025

(54) INFORMATION PROCESSING APPARATUS, NON-TRANSITORY COMPUTER READABLE MEDIUM STORING COMPUTER PROGRAM, AND INFORMATION PROCESSING METHOD

(71) Applicant: FUJIFILM Business Innovation Corp., Tokyo (JP)

(72) Inventor: Yoshiyuki Yoda, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 332 days.

(21) Appl. No.: 17/959,287

(22) Filed: Oct. 3, 2022

(65) Prior Publication Data
US 2023/0300261 A1    Sep. 21, 2023

(30) Foreign Application Priority Data
Mar. 16, 2022   (JP) .................... 2022-041594

(51) Int. Cl.
*H04N 1/00* (2006.01)

(52) U.S. Cl.
CPC ..... *H04N 1/00076* (2013.01); *H04N 1/00039* (2013.01); *H04N 1/00063* (2013.01); *H04N 1/00087* (2013.01); *H04N 2201/0094* (2013.01)

(58) Field of Classification Search
CPC ........... H04N 1/00076; H04N 1/00039; H04N 1/00063
See application file for complete search history.

(56) References Cited

U.S. PATENT DOCUMENTS

| | | | |
|---|---|---|---|
| 6,718,490 B1* | 4/2004 | Takemoto | G03G 15/5079 715/707 |
| 9,247,142 B2 | 1/2016 | Kim et al. | |
| 9,569,157 B2 | 2/2017 | Ochi | |
| 2012/0200890 A1* | 8/2012 | Okumura | H04N 1/00063 358/1.15 |

FOREIGN PATENT DOCUMENTS

| | | |
|---|---|---|
| JP | 2014056547 | 3/2014 |
| JP | 2016086379 | 5/2016 |
| WO | 2012002603 | 1/2012 |

* cited by examiner

*Primary Examiner* — Ibrahim Siddo
(74) *Attorney, Agent, or Firm* — JCIPRNET (57) ABSTRACT

An information processing apparatus includes a processor configured to acquire history data of a process performed by an apparatus installed in a real environment, search for history data that matches a content of a part of items included in history data of the process that is erroneously finished and is history data of the identical process that is normally finished in another apparatus installed in the real environment, from history data of the other apparatus, extract a difference between the history data of the erroneously finished process and the history data of the normally finished process, and suggest a setting for normally finishing the process to the apparatus based on the extracted difference.

11 Claims, 8 Drawing Sheets

EXECUTION LOGS:
12/24/2021 9:00:10 RECEPTION START
    COMMUNICATION SETTING ON APPARATUS SIDE: RECEPTION BUFFER SIZE
    128 KB, LPR COMMUNICATION TIMEOUT 30 sec
    Protocol: LPR
    Client ADDRESS: 192.168.0.1
    Client OS: OS Ver.11
12/24/2021 9:00:10 SPOOLING START
12/24/2021 9:00:20 RECEPTION BUFFER FULL
12/24/2021 9:00:30 RECEPTION BUFFER FULL
12/24/2021 9:00:40 RECEPTION BUFFER FULL
12/24/2021 9:00:50 RECEPTION COMPLETED
12/24/2021 9:00:50 SPOOLING FINISH
    PRINTING DATA: <BINARY DATA (PDL DATA)>, 200 MB
12/24/2021 9:00:50 DRAWING PROCESS START
    PDL SETTING ON APPARATUS SIDE: IMAGE QUALITY PRIORITIZED
    USER NAME: user01
    PASSWORD: pass01
    SETTING OF Client DRIVER: COLOR, PHOTO QUALITY
    Client APPLICATION: DOCUMENT CREATION APPLICATION Ver. 2016
12/24/2021 9:00:52 OCCURRENCE OF ERROR (MISSING PRINTING DATA)
```

DATE AND TIME: 12/24/2021 9:00:10
FUNCTION: Print
Protocol: LPR
Client OS: OS Ver.11
RECEPTION DATA SIZE: 200 MB
SETTING OF Client DRIVER: COLOR, PHOTO QUALITY
Client APPLICATION: DOCUMENT CREATION APPLICATION Ver. 2020
COMMUNICATION SETTING ON APPARATUS SIDE: RECEPTION BUFFER SIZE 128 KB, LPR COMMUNICATION TIMEOUT 30 sec
PDL SETTING ON APPARATUS SIDE: IMAGE QUALITY PRIORITIZED
ERROR CODE: MISSING PRINTING DATA

FIG. 9

```
DATE AND TIME: 12/21/2021 11:20:10
FUNCTION: Print
Protocol: LPR
Client OS: OS Ver.10
RECEPTION DATA SIZE: 200 MB
SETTING OF Client DRIVER: COLOR, PHOTO QUALITY
Client APPLICATION: DOCUMENT CREATION APPLICATION Ver. 2016
COMMUNICATION SETTING ON APPARATUS SIDE: RECEPTION BUFFER SIZE 128 KB, LPR COMMUNICATION TIMEOUT 30 sec
PDL SETTING ON APPARATUS SIDE: IMAGE QUALITY PRIORITIZED
ERROR CODE: NORMAL FINISH
```

INFORMATION PROCESSING APPARATUS, NON-TRANSITORY COMPUTER READABLE MEDIUM STORING COMPUTER PROGRAM, AND INFORMATION PROCESSING METHOD

CROSS-REFERENCE TO RELATED APPLICATIONS

This application is based on and claims priority under 35 USC 119 from Japanese Patent Application No. 2022-041594 filed Mar. 16, 2022.

BACKGROUND

(i) Technical Field

The present invention relates to an information processing apparatus, a non-transitory computer readable medium storing a computer program, and an information processing method.

(ii) Related Art

JP2016-086379A discloses an image forming apparatus including a control unit that controls an apparatus operation, and an analysis unit that analyzes maintenance information corresponding to the apparatus in a case where an event requiring maintenance management occurs, in which the maintenance information includes a plurality of solution methods for solving the event requiring maintenance management, the analysis unit decides an application order of the solution methods for the apparatus, and the control unit controls the apparatus operation based on the application order of the solution methods analyzed by the analysis unit.

SUMMARY

In order to solve a defective state using a method of solving the defective state by sequentially applying a setting change automatically in accordance with an error handling procedure, preparation of a plurality of setting change procedures linked to an error occurring in an apparatus in advance is required.

Aspects of non-limiting embodiments of the present disclosure relate to an information processing apparatus, a non-transitory computer readable medium storing a computer program, and an information processing method that can specify a setting for resolving an error occurring in a process performed by an apparatus installed in a real environment.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire history data of a process performed by an apparatus installed in a real environment, search for history data that matches a content of a part of items included in history data of the process that is erroneously finished and is history data of the identical process that is normally finished in another apparatus installed in the real environment, from history data of the other apparatus, extract a difference between the history data of the erroneously finished process and the history data of the normally finished process, and suggest a setting for normally finishing the process to the apparatus based on the extracted difference.

BRIEF DESCRIPTION OF THE DRAWINGS

Exemplary embodiment(s) of the present invention will be described in detail based on the following figures, wherein.

DETAILED DESCRIPTION

Hereinafter, an example of an exemplary embodiment of the present invention will be described with reference to the drawings. In each drawing, identical or equivalent constituents and parts are designated by identical reference signs. In addition, dimensional ratios in the drawings are exaggerated for convenience of description and may be different from actual ratios.

Figure 1:
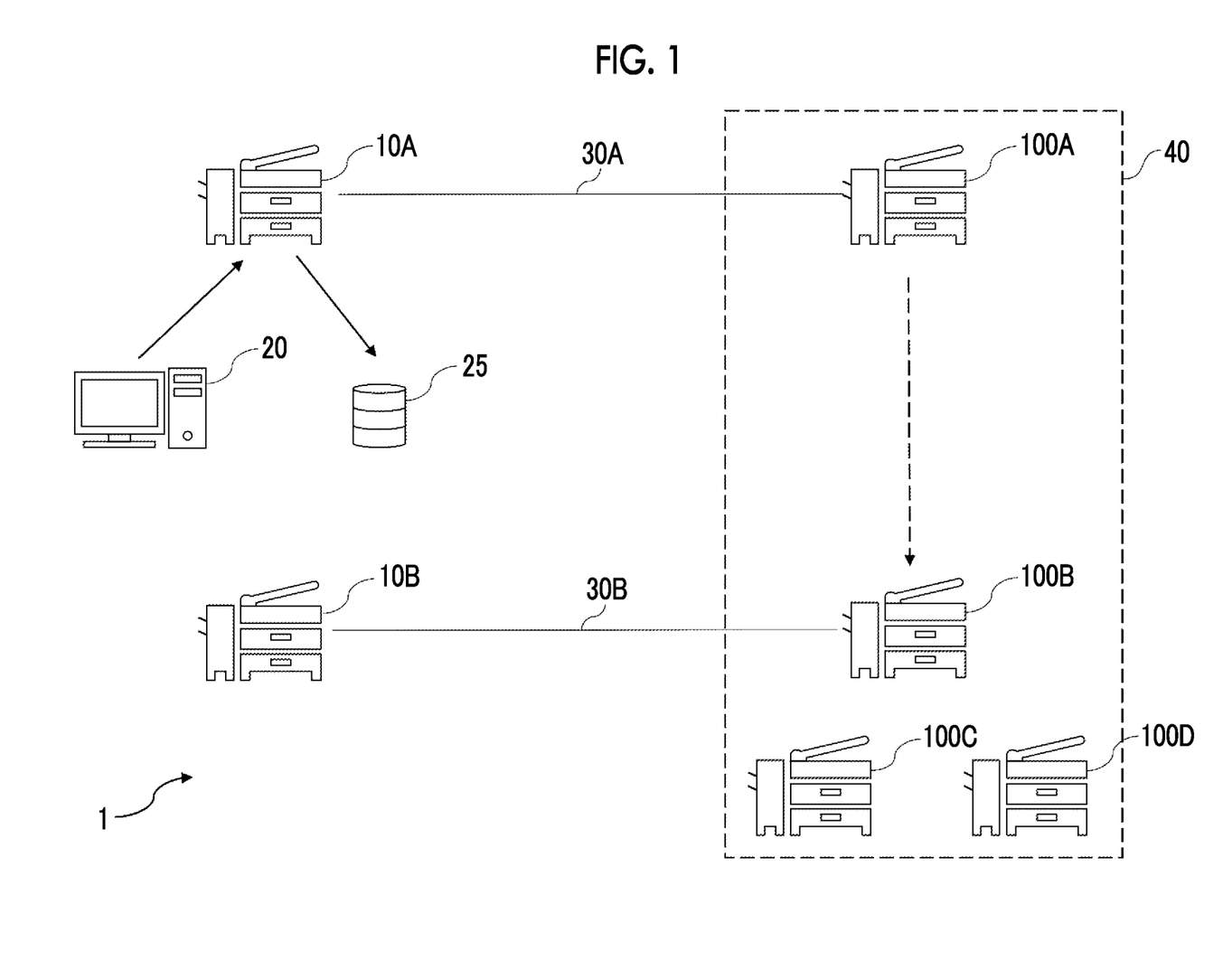
FIG. 1 is a diagram illustrating a schematic configuration of an information processing system according to an exemplary embodiment of the disclosed technology.

FIG. 1 is a diagram illustrating a schematic configuration of an information processing system according to the present exemplary embodiment. An information processing system 1 illustrated in FIG. 1 includes multifunction peripherals 10A and 10B, a personal computer (PC) 20, a storage server 25, networks 30A and 30B, and a cloud network 40.

The multifunction peripherals 10A and 10B are apparatuses installed in a real environment and are image forming apparatuses having any plurality of functions among a plurality of functions such as a copying function, a printing function, a scanner function, a facsimile function, and an optical character recognition (OCR) function. For example, in a case where a printing job is received from the PC 20, the multifunction peripheral 10A executes a printing process based on the printing job. In addition, for example, the multifunction peripheral 10A has a function of scanning a document and transmitting scan data to the PC 20 or the storage server 25. In the following description, the multifunction peripherals 10A and 10B will be simply described as a multifunction peripheral 10 unless otherwise necessary to distinguish.

The cloud network 40 is a network on the cloud in which virtual multifunction peripherals 100A, 100B, storing a setting of the multifunction peripheral 10 in synchronization with the multifunction peripheral 10 are present. The virtual multifunction peripheral 100A stores a setting of the multifunction peripheral 10A in synchronization with the multifunction peripheral 10A, and the virtual multifunction peripheral 100B stores a setting of the multifunction peripheral 10B in synchronization with the multifunction peripheral 10B. A multifunction peripheral installed in the real environment and a virtual multifunction peripheral present in the cloud network 40 are in a one-to-one correspondence. In the following description, the virtual multifunction peripherals 100A, 100B, . . . will be simply described as a virtual multifunction peripheral 100 unless otherwise necessary to distinguish. The virtual multifunction peripheral 100 is an example of an information processing apparatus according to the exemplary embodiment of the present invention.

The virtual multifunction peripheral 100 is not present as a multifunction peripheral and is present in order to store the setting of the multifunction peripheral 10. Accordingly, for example, the virtual multifunction peripheral 100 is constructed in a server.

The multifunction peripheral 10A is connected to the cloud network 40 via the network 30A and synchronizes the setting with the virtual multifunction peripheral 100A. The multifunction peripheral 10B is connected to the cloud network 40 via the network 30B and synchronizes the setting with the virtual multifunction peripheral 100B. The networks 30A and 30B may include both of a wired network and a wireless network. In the following description, the networks 30A and 30B will be simply described as a network 30 unless otherwise necessary to distinguish.

A case where a process based on the function of the multifunction peripheral 10 is executed and the process is erroneously finished is considered. There are various reasons for the erroneous finish, and trying to resolve the error by checking a content of the error each time the error occurs requires a large amount of effort for a manager of the multifunction peripheral 10. In a case where the error frequently occurs, there is a possibility that the error can be easily resolved by preparing an error resolution procedure in advance, compared to a case where the resolution procedure is not present. However, in a case where an error for which the error resolution procedure is not present occurs, the manager is still required to try to resolve the error.

Therefore, in the present exemplary embodiment, in a case where the process is erroneously finished in the multifunction peripheral 10, the virtual multifunction peripheral 100 corresponding to the multifunction peripheral 10 acquires history data of the multifunction peripheral 10 and searches for history data of another multifunction peripheral 10 in which an identical process is normally finished. The virtual multifunction peripheral 100 extracts a difference in the history data and specifies a setting for resolving the error based on the difference. In a case where the setting for resolving the error is specified, the virtual multifunction peripheral 100 generates a verification procedure for resolving the error. The virtual multifunction peripheral 100 may first use the history data (referred to as summarized history data) summarized in the multifunction peripheral 10 as a target for the acquisition and the search. In a case where the difference cannot be extracted from the summarized history data, the virtual multifunction peripheral 100 may use detailed non-summarized history data (referred to as detailed history data) as the target for the acquisition and the search.

By executing such a procedure, the virtual multifunction peripheral 100 according to the present exemplary embodiment may specify the setting for resolving the error occurring in the process performed by the multifunction peripheral 10 installed in the real environment.

Figure 2:
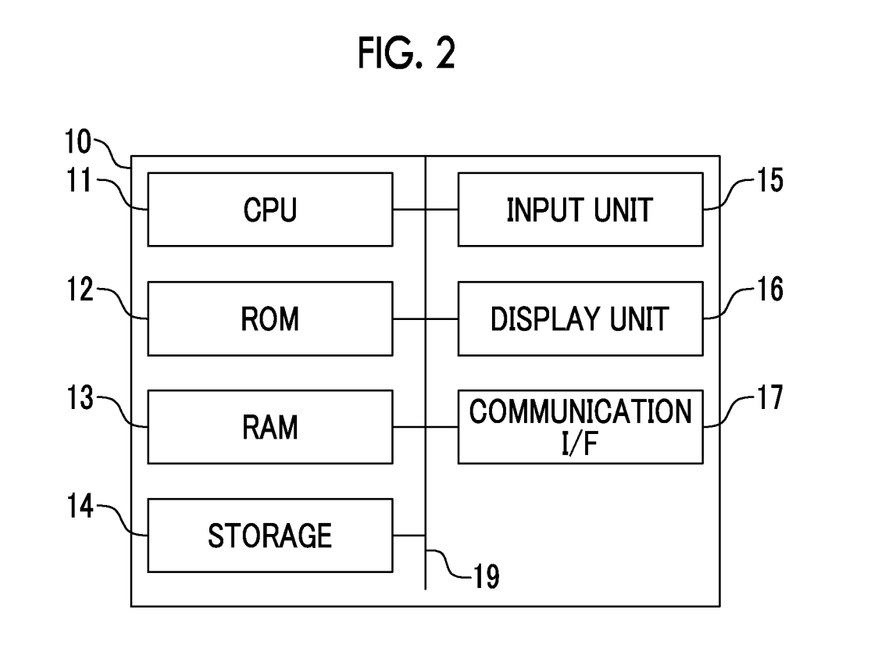
FIG. 2 is a block diagram illustrating a hardware configuration of a multifunction peripheral.

FIG. 2 is a block diagram illustrating a hardware configuration of the multifunction peripheral 10.

As illustrated in FIG. 2, the multifunction peripheral 10 includes a central processing unit (CPU) 11, a read only memory (ROM) 12, a random access memory (RAM) 13, a storage 14, an input unit 15, a display unit 16, and a communication interface (I/F) 17. These configurations are communicably connected to each other via a bus 19.

The CPU 11 is a central calculation processing unit and executes various programs or controls each unit. That is, the CPU 11 reads a program from the ROM 12 or the storage 14 and executes the program using the RAM 13 as a work region. The CPU 11 controls each configuration and performs various calculation processes in accordance with the program recorded in the ROM 12 or the storage 14. In the present exemplary embodiment, the ROM 12 or the storage 14 stores a program for executing the function of the multifunction peripheral 10 and an information processing program for executing the verification procedure generated based on the setting specified by the virtual multifunction peripheral 100.

The ROM 12 stores various programs and various data. The RAM 13 temporarily stores a program or data as the work region. The storage 14 is configured with a storage apparatus such as a hard disk drive (HDD), a solid state drive (SSD), or a flash memory and stores various programs including an operating system and various data.

The input unit 15 is used for providing various inputs.

The display unit 16 is, for example, a liquid crystal display and displays various information. The display unit 16 may function as the input unit 15 by employing a touch panel type.

The communication interface 17 is an interface for communicating with another apparatus such as the PC 20, the storage server 25, or the cloud network 40 and, for example, uses standards such as Ethernet (registered trademark), FDDI, and Wi-Fi (registered trademark).

Figure 3:
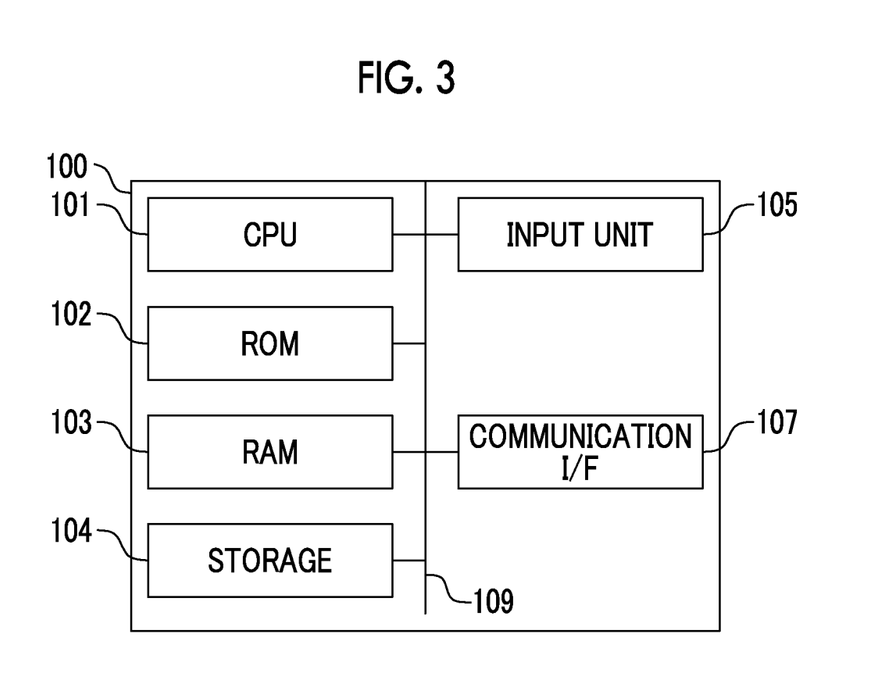
FIG. 3 is a block diagram illustrating a hardware configuration of a virtual multifunction peripheral present in a cloud network.

FIG. 3 is a block diagram illustrating a hardware configuration of the virtual multifunction peripheral 100 present in the cloud network 40.

As illustrated in FIG. 3, the virtual multifunction peripheral 100 includes a CPU 101, a ROM 102, a RAM 103, a storage 104, an input unit 105, and a communication interface (I/F) 107. These configurations are communicably connected to each other via a bus 109.

The CPU 101 is a central calculation processing unit and executes various programs or controls each unit. That is, the CPU 101 reads a program from the ROM 102 or the storage 104 and executes the program using the RAM 103 as a work region. The CPU 101 controls each configuration and performs various calculation processes in accordance with the program recorded in the ROM 102 or the storage 104. In the present exemplary embodiment, the ROM 102 or the storage 104 stores an information processing program for specifying the difference between the history data of the multifunction peripheral 10 in which the process is erroneously finished and the history data of the multifunction peripheral 10 in which the identical process is normally finished, and generating the verification procedure based on the specified difference.

The ROM 102 stores various programs and various data. The RAM 103 temporarily stores a program or data as the work region. The storage 104 is configured with a storage apparatus such as an HDD, an SSD, or a flash memory and stores various programs including an operating system and various data.

The input unit 105 is used for providing various inputs.

The communication interface 107 is an interface for communicating with another apparatus such as the multifunction peripheral 10 and, for example, uses standards such as Ethernet (registered trademark), FDDI, and Wi-Fi (registered trademark).

Next, functional configurations of the multifunction peripheral 10 and the virtual multifunction peripheral 100 will be described.

Figure 4:
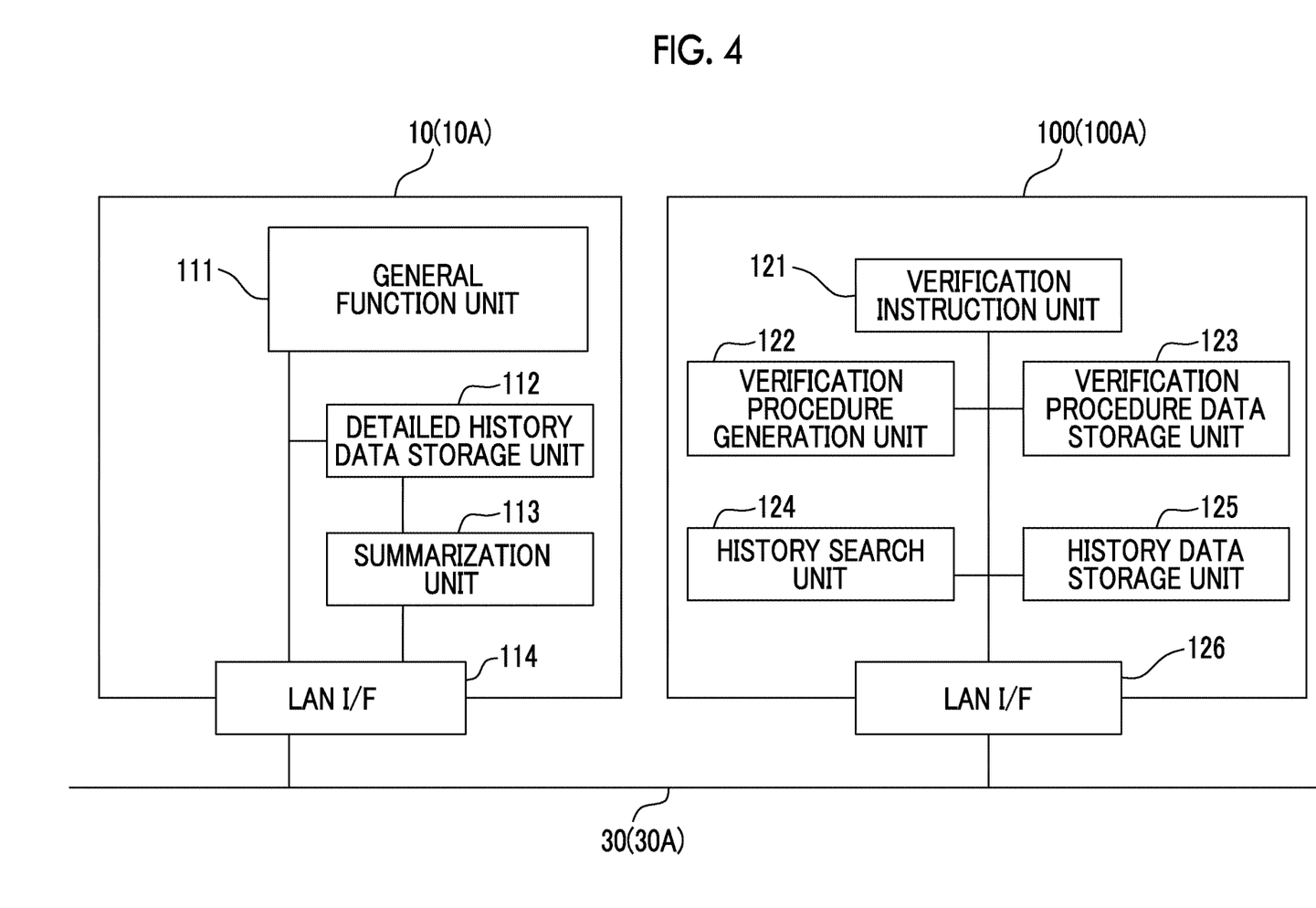
FIG. 4 is a block diagram illustrating an example of functional configurations of the multifunction peripheral and the virtual multifunction peripheral.

FIG. 4 is a block diagram illustrating an example of the functional configurations of the multifunction peripheral 10 and the virtual multifunction peripheral 100.

As illustrated in FIG. 4, the multifunction peripheral 10 includes a general function unit 111, a detailed history data storage unit 112, a summarization unit 113, and a LAN I/F 114 as the functional configurations. Each functional configuration is implemented by causing the CPU 11 to read and execute the information processing program stored in the ROM 12 or the storage 14.

In addition, as illustrated in FIG. 4, the virtual multifunction peripheral 100 includes a verification instruction unit 121, a verification procedure generation unit 122, a verification procedure data storage unit 123, a history search unit 124, a history data storage unit 125, and a LAN I/F 126. Each functional configuration is implemented by causing the CPU 101 to read and execute the information processing program stored in the ROM 102 or the storage 104.

The general function unit 111 has any plurality of functions among a plurality of functions such as the copying function, the printing function, the scanner function, and the facsimile function. A process of the function of the general function unit 111 is executed based on an operation performed by a user, transmission of a job from the PC 20 or the like, and the like.

The detailed history data storage unit 112 stores the detailed history data in a case where the function of the general function unit 111 executes the process. While a specific example of the detailed history data stored in the detailed history data storage unit 112 will be described in detail later, for example, detailed history data including the setting of the multifunction peripheral 10 at a time of a function operation, a request (printing data, an information request, application information of a request source, OS information of the request source, and the like) to the multifunction peripheral 10 via a network, a user interface operation, and an output result (scan data, information response data, application information of a transmission destination, OS information of the transmission destination, and the like) is stored.

The summarization unit 113 summarizes the detailed history data stored in the detailed history data storage unit 112. An example of summarizing the detailed history data by the summarization unit 113 will be described later. For example, the summarization unit 113 summarizes the detailed history data by removing information in a warning or event level, authentication information, and the like. By summarizing the detailed history data, the summarization unit 113 may reduce a storage capacity of the history data in the virtual multifunction peripheral 100. In addition, by removing personal information such as the authentication information by summarizing the detailed history data, the summarization unit 113 can reduce a risk of leak of the personal information.

The LAN I/F 114 is connected to the network 30 and executes communication with the PC 20, the storage server 25, the cloud network 40, and the like. In a case where the general function unit 111 executes the process, the multifunction peripheral 10 transmits the history data summarized by the summarization unit 113 to the virtual multifunction peripheral 100 via the LAN I/F 114.

In a case where the process executed by the multifunction peripheral 10 is erroneously finished, the verification instruction unit 121 provides an instruction to verify a reason for the erroneous finish. In a case where the erroneous finish of the function executed by the multifunction peripheral 10 is detected from the history data transmitted from the multifunction peripheral 10, the verification instruction unit 121 causes the history search unit 124, described later, to search for the history data of the process executed by the other multifunction peripheral 10.

In a case where the process executed by the multifunction peripheral 10 is erroneously finished, the verification procedure generation unit 122 generates verification procedure data for resolving the error. The verification procedure data storage unit 123 stores the verification procedure data generated by the verification procedure generation unit 122.

The history search unit 124 searches for the history data of the process that is a process identical to the erroneously finished process executed by the multifunction peripheral 10 and is normally finished in the other multifunction peripheral 10, in accordance with the instruction of the verification instruction unit 121. Specifically, the history search unit 124 searches for the history data of the multifunction peripheral 10 in which the process is normally finished in a similar environment, for example, an environment in which a combination or the like of an application and a type of OS of a communication counterpart such as a request source or a response destination is identical, and detects a difference between the history data and the setting of the erroneously finished multifunction peripheral 10.

In the search for the history data summarized by the history search unit 124, in a case where a difference between the multifunction peripheral 10 in which the process is normally finished and the multifunction peripheral 10 in which the process is erroneously finished cannot be detected, the verification instruction unit 121 acquires the detailed history data from the corresponding multifunction peripheral 10. In addition, the verification instruction unit 121 requests another virtual multifunction peripheral 100 to acquire the detailed history data from the corresponding multifunction peripheral 10.

The history data storage unit 125 stores the history data summarized in the multifunction peripheral 10. In the search for the history data, the history search unit 124 searches for the summarized history data stored in the virtual multifunction peripheral 100 corresponding to the other multifunction peripheral 10. In the exemplary embodiment of the present invention, the summarized history data may not be stored inside the virtual multifunction peripheral 100, and the history search unit 124 may search for a storage in which the summarized history data is collected.

The LAN I/F 126 is connected to the network 30 and executes communication with the multifunction peripheral 10.

By having such a configuration, the virtual multifunction peripheral 100 may specify the setting for resolving the error occurring in the process performed by the multifunction peripheral 10 installed in the real environment.

Next, actions of the multifunction peripheral 10 and the virtual multifunction peripheral 100 will be described.

Figure 5:
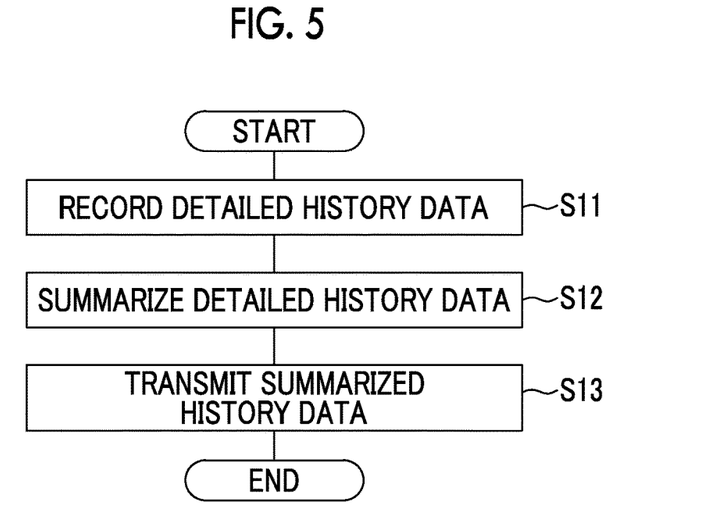
FIG. 5 is a flowchart illustrating a flow of information processing performed by the multifunction peripheral.

FIG. 5 is a flowchart illustrating a flow of information processing performed by the multifunction peripheral 10. The information processing performed by the multifunction peripheral 10 is performed by causing the CPU 11 to read the information processing program from the ROM 12 or the storage 14, load the information processing program into the RAM 13, and execute the information processing program.

The flowchart illustrated in FIG. 5 is a flow in a case where the process based on the function of the multifunction peripheral 10 is executed, and is, for example, a flow in a case where the process is erroneously finished as a result of executing the process based on the function of the multifunction peripheral 10.

Figure 6:
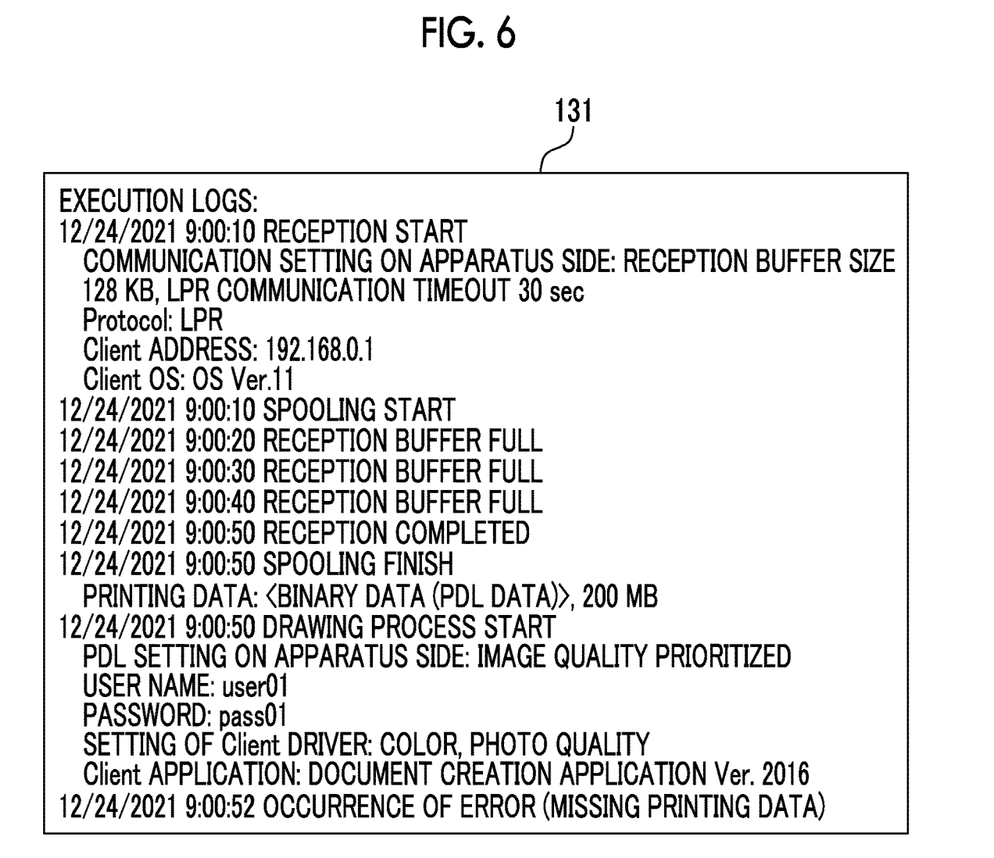
FIG. 6 is a diagram illustrating an example of detailed history data of the multifunction peripheral in which a process is erroneously finished.

In step S11, in a case where the process is erroneously finished, the CPU 11 records the detailed history data of the process. FIG. 6 is a diagram illustrating an example of detailed history data 131 of the process recorded by the CPU 11. Details about the process are recorded in the detailed history data 131 of the process. For example, the detailed history data 131 of the process includes not only a specific content of the process and a result of the process but also personal information such as an IP address and authentication information of a client.

Figure 7:
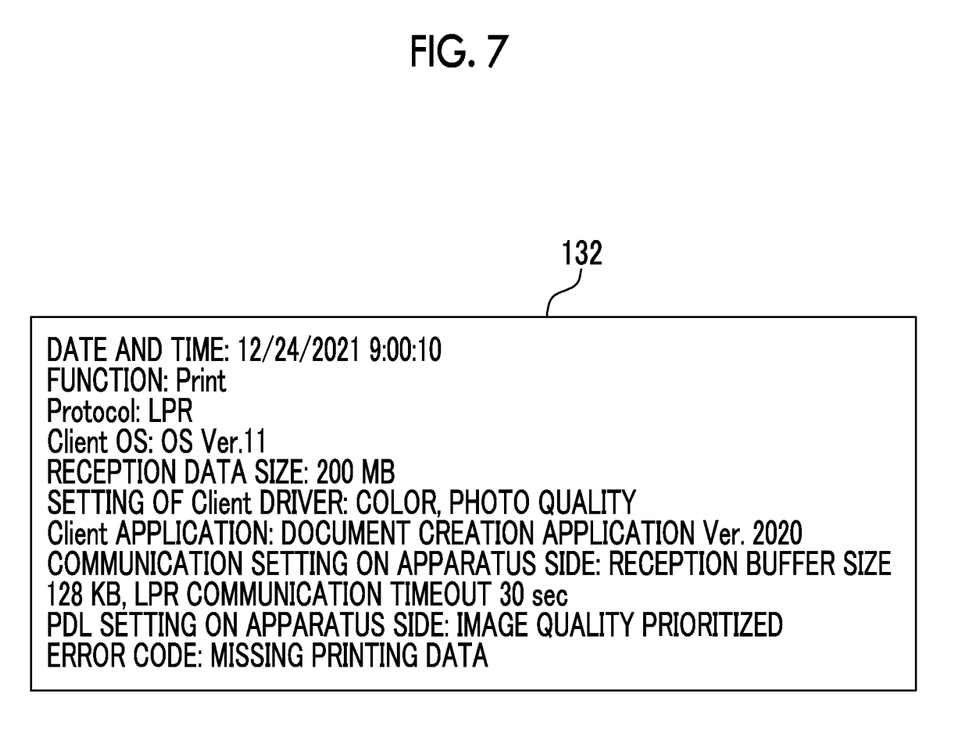
FIG. 7 is a diagram illustrating an example of summarized history data of the multifunction peripheral in which the process is erroneously finished.

In a case where the detailed history data of the process is recorded, the CPU 11 next summarizes the detailed history data of the process in step S12. FIG. 7 is a diagram illustrating an example of summarized history data 132 obtained by summarizing the detailed history data 131 by the CPU 11. The summarized history data 132 includes the detailed history data 131 from which information in a warning level or an event level and the personal information such as the IP address and the authentication information of the client are removed.

In a case where the summarized history data of the process is created, the CPU 11 next transmits the summarized history data to the virtual multifunction peripheral 100 in step S13.

Figure 8:
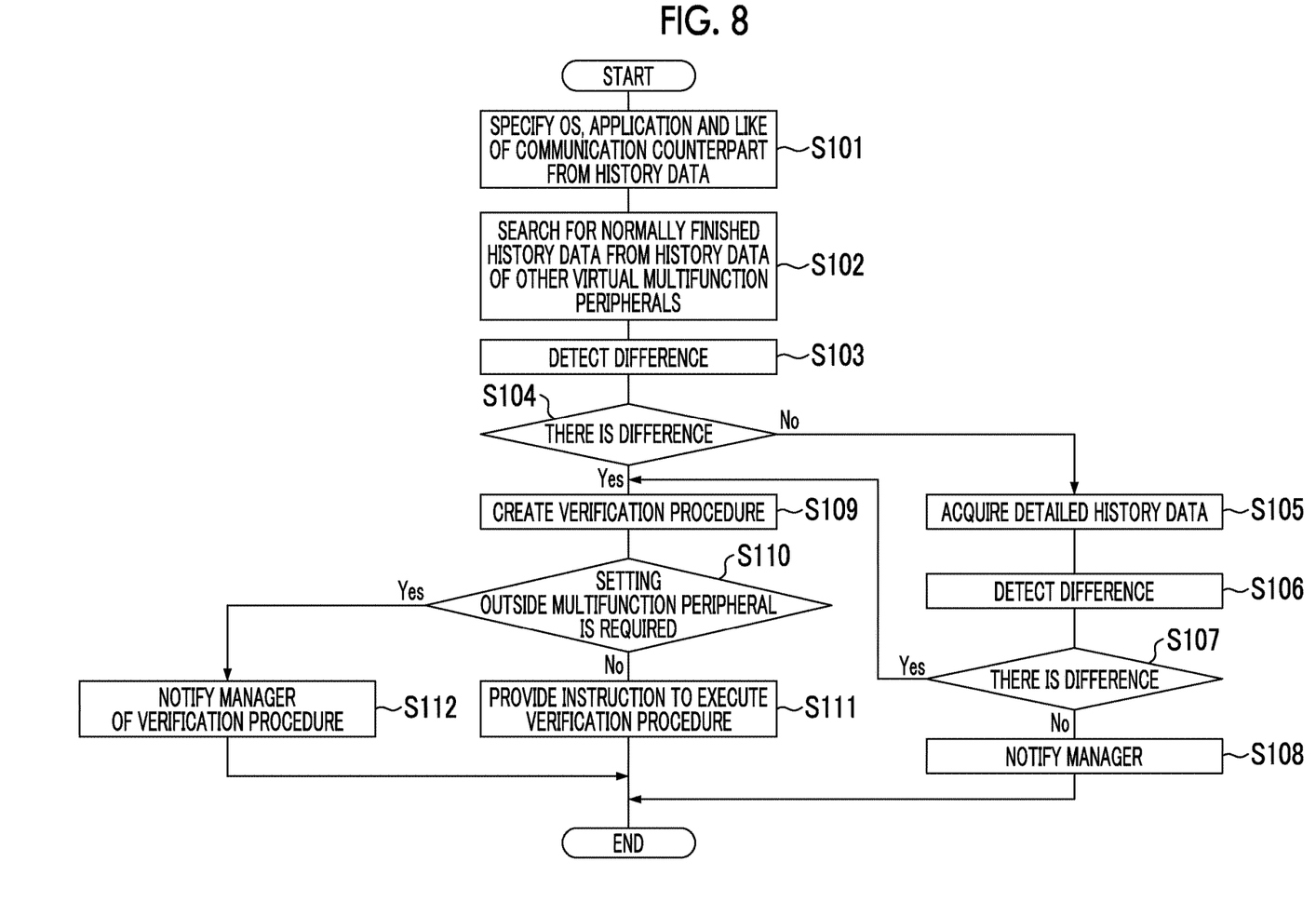
FIG. 8 is a flowchart illustrating a flow of information processing performed by the virtual multifunction peripheral.

FIG. 8 is a flowchart illustrating a flow of information processing performed by the virtual multifunction peripheral 100. The information processing performed by the virtual multifunction peripheral 100 is performed by causing the CPU 101 to read the information processing program from the ROM 102 or the storage 104, load the information processing program into the RAM 103, and execute the information processing program.

The flowchart illustrated in FIG. 8 is a flow in a case of trying to resolve the error by specifying a cause of the error in a case where the process performed in the corresponding multifunction peripheral 10 is erroneously finished.

In step S101, first, the CPU 101 specifies the OS of the communication counterpart (for example, the PC 20) of the multifunction peripheral 10, the application used for the process of the multifunction peripheral 10 by the communication counterpart, and the like from the summarized history data.

Next, in step S102, the CPU 101 searches for the summarized history data that is summarized history data of the identical process normally finished in the other multifunction peripheral 10 and matches a content of a part of items included in the summarized history data of the process erroneously finished in the multifunction peripheral 10, from the summarized history data of the other virtual multifunction peripheral 100. For example, the CPU 101 searches for the history data having a matching combination of characteristics (an OS name, an application name, a vendor name, a driver setting, and an application setting) of the communication counterpart of the multifunction peripheral 10 and functions (a communication setting, an authentication setting, a drawing setting, and the like) related to the operation on the multifunction peripheral 10 side.

Next, in step S103, the CPU 101 detects a difference between the summarized history data of the multifunction peripheral 10 in which the process is erroneously finished and the summarized history data of the multifunction peripheral 10 in which the process is normally finished.

Next, in step S104, the CPU 101 determines whether or not there is a difference between the summarized history data of the multifunction peripheral 10 in which the process is erroneously finished and the summarized history data of the multifunction peripheral 10 in which the process is normally finished.

Figure 9:
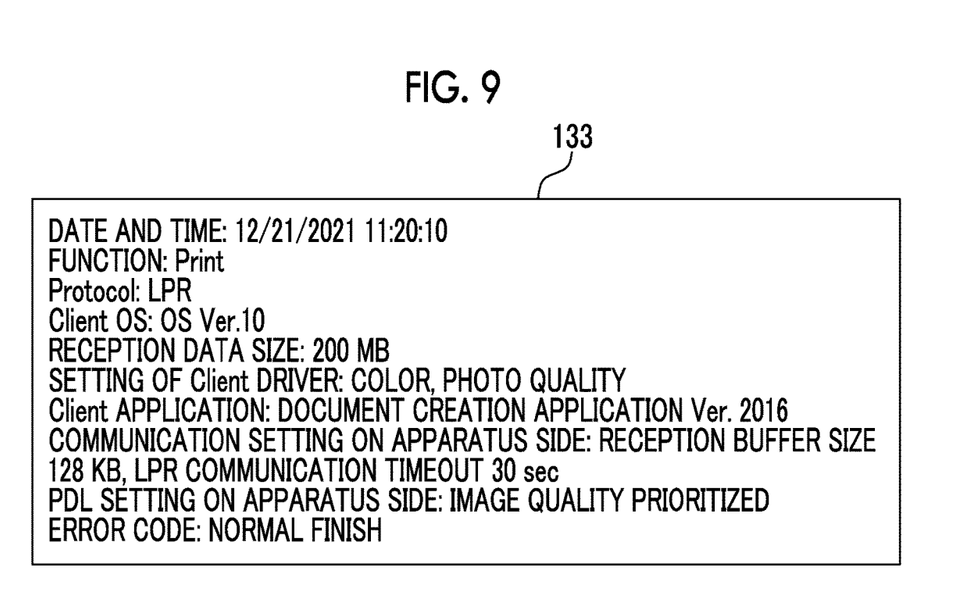
FIG. 9 is a diagram illustrating an example of the summarized history data of the multifunction peripheral in which the process is normally finished.

FIG. 9 is a diagram illustrating an example of summarized history data 133 of the multifunction peripheral 10 in which the process is normally finished. The CPU 101 compares the summarized history data 132 of the multifunction peripheral 10 in which the process is erroneously finished with the summarized history data 133 of the multifunction peripheral 10 in which the process is normally finished, and detects a difference. In this example, differences in "Client OS" and "Client application" are perceived in a case where the summarized history data 132 is compared with the summarized history data 133.

As a result of the determination in step S104, in a case where there is no difference between the summarized history data 132 of the multifunction peripheral 10 in which the process is erroneously finished and the summarized history data 133 of the multifunction peripheral 10 in which the process is normally finished (step S104: No), the CPU 101 next acquires the detailed history data of the multifunction peripheral 10 in which the process is erroneously finished in step S105. Next, in step S106, the CPU 101 detects a difference between the detailed history data of the multifunction peripheral 10 in which the process is erroneously finished and the detailed history data of the multifunction peripheral 10 in which the process is normally finished.

After step S106, the CPU 101 determines whether or not there is a difference between the detailed history data of the multifunction peripheral 10 in which the process is erroneously finished and the detailed history data of the multifunction peripheral 10 in which the process is normally finished in step S107. The IP address or a credential value of authentication that may be included in the detailed history data and depends on an environment of the client is personal data. Thus, the CPU 101 may refer to the personal data under contract with the client.

As a result of the determination in step S107, in a case where there is no difference (step S107: No), the CPU 101 notifies the manager to contact support because a difference is not found in step S108.

On the other hand, as a result of the determination in step S104, in a case where there is a difference between the summarized history data 132 of the multifunction peripheral 10 in which the process is erroneously finished and the summarized history data 133 of the multifunction peripheral 10 in which the process is normally finished (step S104: Yes), the CPU 101 next generates the verification procedure for resolving the error of the multifunction peripheral 10 in which the process is erroneously finished in step S109.

In the example in FIG. 9, since the differences in "Client OS" and "Client application" are perceived, the CPU 101 generates the verification procedure indicating changing "Client OS" and "Client application".

After step S109, the CPU 101 determines whether or not the generated verification procedure requires a setting outside the multifunction peripheral 10 in step S110. In the above example, changing "Client OS" and "Client application" means changing a setting outside the multifunction peripheral 10, that is, a setting of the PC 20.

As a result of the determination in step S110, in a case where the generated verification procedure requires a setting outside the multifunction peripheral 10 (step S110: Yes), the CPU 101 notifies the manager of the multifunction peripheral 10 of the verification procedure in step S112. In the above example, the CPU 101 notifies the manager of the multifunction peripheral 10 to try to change an OS or an application of the PC 20.

On the other hand, as a result of the determination in step S110, in a case where the generated verification procedure requires the setting of the multifunction peripheral 10 (step S110: No), the CPU 101 notifies the multifunction peripheral 10 to instruct the multifunction peripheral 10 to execute the verification procedure in step S111.

In a case where the number of pieces of the matching history data is large, the CPU 101 may suggest a setting for normally finishing the process to the multifunction peripheral 10 by analyzing a distribution of setting values related to the executed function in all history data or sampled history data. In addition, for example, in a case where the number of pieces of the matching history data is large, the CPU 101 may extract a setting value of which a content is most commonly applied by analyzing the distribution of the setting values related to the executed function in all history data or the sampled history data, and increase a priority of the setting change in the verification procedure temporarily applied to the multifunction peripheral 10 in which the error occurs.

While a case where candidates of the setting change are not found even in a case where a matching history is present may sufficiently occur, matching of all of credential information, the IP address, PDL data, and an execution time does not occur. Difference information obtained at a time of comparison is information useful for analyzing the error. Thus, the CPU 101 may notify the manager or a responsible person of the support of the difference information.

Figure 10:
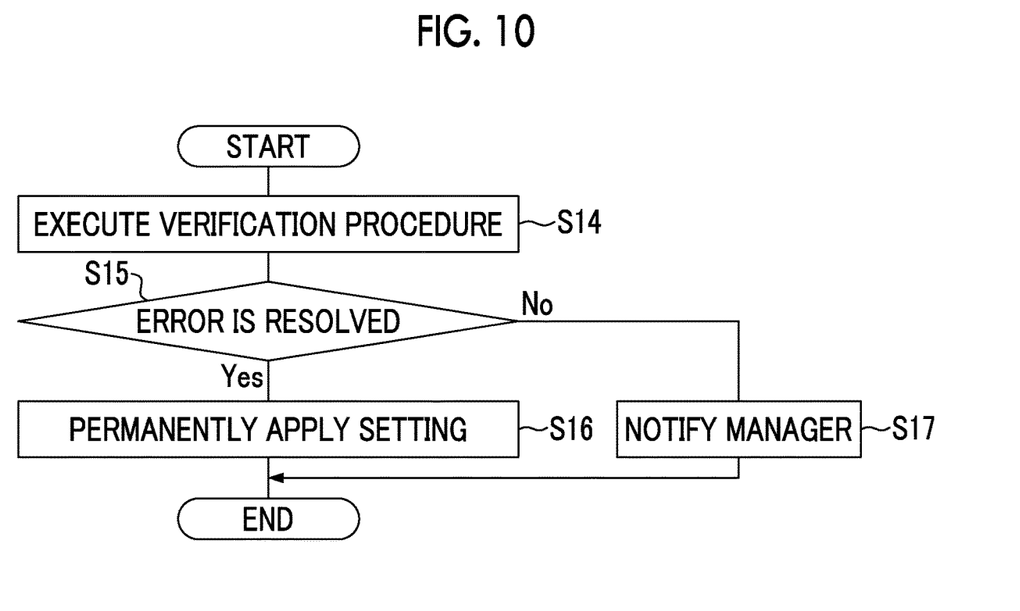
FIG. 10 is a flowchart illustrating a flow of information processing performed by the multifunction peripheral.

FIG. 10 is a flowchart illustrating a flow of information processing performed by the multifunction peripheral 10. The information processing performed by the multifunction peripheral 10 is performed by causing the CPU 11 to read the information processing program from the ROM 12 or the storage 14, load the information processing program into the RAM 13, and execute the information processing program.

The flowchart illustrated in FIG. 10 is a flow in a case of executing the verification procedure generated by the virtual multifunction peripheral 100. In step S14, the CPU 11 acquires the verification procedure generated by the virtual multifunction peripheral 100 and executes the verification procedure. For example, the CPU 11 executes the setting change such as increasing a reception buffer size or extending a timeout time period.

Figure 11:
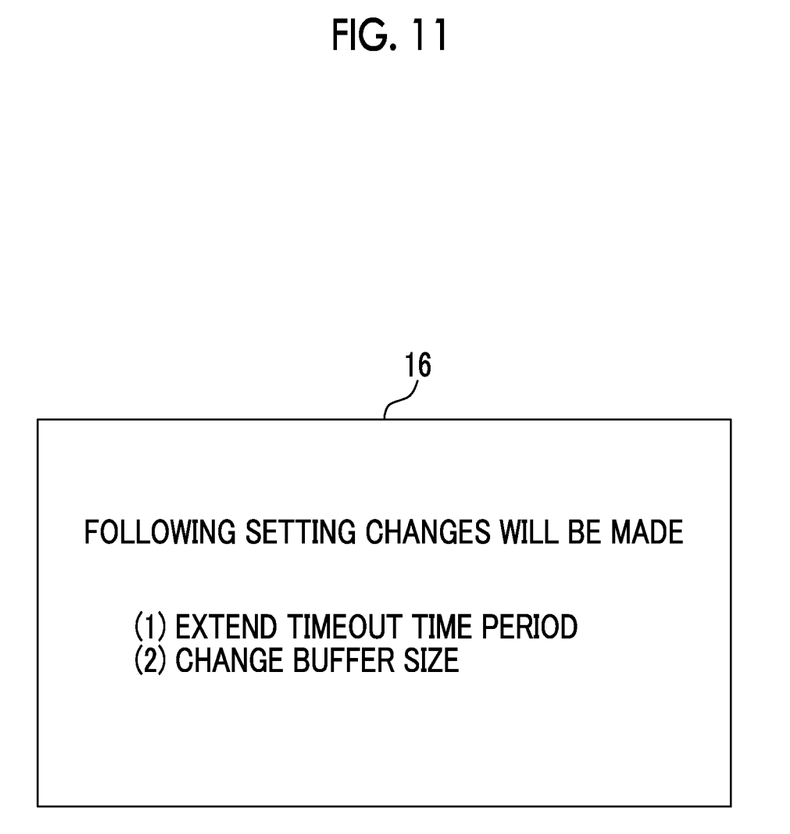
FIG. 11 is a diagram illustrating an example of a screen displayed by a CPU.

FIG. 11 is a diagram illustrating an example of a screen displayed on the display unit 16 by the CPU 11. In the example illustrated in FIG. 11, extending the timeout time period and changing the reception buffer size are displayed on the display unit 16 as the verification procedure generated by the virtual multifunction peripheral 100. By displaying the screen illustrated in FIG. 11 on the display unit 16, the CPU 11 can show the manager of the multifunction peripheral 10 which setting is to be changed.

After step S14, the CPU 11 determines whether or not the error is resolved as a result of executing the verification procedure in step S15.

In step S15, in a case where the error is resolved (step S15: Yes), the CPU 11 reflects the setting on the multifunction peripheral 10 by permanently applying the changed setting in step S16. On the other hand, in step S15, in a case where the error is not resolved (step S15: No), the CPU 11 notifies the manager to contact the support because the error is not resolved even by changing the setting in step S17. For example, this notification may be a notification of a request for detailed analysis of data.

By executing the operation illustrated in FIG. 8, the virtual multifunction peripheral 100 can detect a difference between the multifunction peripheral 10 in which the process is erroneously finished and the multifunction peripheral 10 in which the process is normally finished, and in a case where the difference is detected, may generate the verification procedure for resolving the error of the multifunction peripheral 10 in which the process is erroneously finished. By generating the verification procedure based on the difference, the virtual multifunction peripheral 100 may generate the verification procedure and cause the multifunction peripheral 10 to execute the verification procedure even in a case where an error for which the verification procedure is not created in advance occurs in the multifunction peripheral 10.

The information processing executed by causing the CPU to read software (program) in each exemplary embodiment may be executed by various processors other than the CPU. In this case, the processors are illustrated by a programmable logic device (PLD) such as a field-programmable gate array (FPGA) having a circuit configuration changeable after manufacturing, a dedicated electric circuit such as an application specific integrated circuit (ASIC) that is a processor having a circuit configuration dedicatedly designed to execute a specific process, and the like. In addition, the information processing may be executed by one of these various processors or may be executed by a combination of two or more processors of the same type or different types (for example, a plurality of FPGAs and a combination of a CPU and an FPGA). In addition, a hardware structure of these various processors is specifically an electric circuit in which circuit elements such as semiconductor elements are combined.

While an aspect in which the program for the information processing is prestored (installed) in the ROM or the storage is described in the exemplary embodiment, the present invention is not limited to the aspect. The program may be provided in the form of a recording on a non-temporary (non-transitory) recording medium such as a compact disk read only memory (CD-ROM), a digital versatile disk read only memory (DVD-ROM), and a universal serial bus (USB) memory. In addition, the program may be in the form of a download from an outside apparatus via a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
    acquire history data of a process performed by an apparatus installed in a real environment;
    search for history data that matches a content of a part of items included in history data of the process that is erroneously finished and is history data of the identical process that is normally finished in another apparatus installed in the real environment, from history data of the other apparatus;
    extract a difference between the history data of the erroneously finished process and the history data of the normally finished process; and
    suggest a setting for normally finishing the process to the apparatus based on the extracted difference.

2. The information processing apparatus according to claim 1, wherein the processor is configured to:
    suggest the setting for normally finishing the process to the apparatus from the difference based on a distribution of contents of items in the history data of the normally finished process.

3. The information processing apparatus according to claim 2, wherein the processor is configured to:
    suggest an item of which a content is most common in a plurality of the other apparatuses to the apparatus by increasing a priority of the item above other items.

4. The information processing apparatus according to claim 1, wherein the processor is configured to:
    acquire history data summarized in the apparatus and search for summarized history data of a process identical to the process from an apparatus holding summarized history data of the other apparatus.

5. The information processing apparatus according to claim 4, wherein the processor is configured to:
    in a case where a difference between summarized history data of the erroneously finished process and summarized history data of the normally finished process is not present, acquire non-summarized history data in the apparatus and extract a difference between non-summarized history data of the erroneously finished process and non-summarized history data of the normally finished process.

6. The information processing apparatus according to claim 1, wherein the processor is configured to:
    generate a verification procedure for applying the setting suggested to the apparatus to the apparatus and reflect the generated verification procedure on the apparatus.

7. The information processing apparatus according to claim 6, wherein the processor is configured to:
    in a case where the process is not erroneously finished based on the verification procedure, permanently reflect the setting on the apparatus.

8. The information processing apparatus according to claim 6, wherein the processor is configured to:
    in a case where the process is erroneously finished even based on the verification procedure, notify the apparatus of a request for analyzing the history data.

9. The information processing apparatus according to claim 1, wherein the apparatus is an image forming apparatus.

10. A non-transitory computer readable medium storing a computer program causing a computer to execute a process comprising:
    acquiring history data of a process performed by an apparatus installed in a real environment;
    searching for history data that matches a content of a part of items included in history data of the process that is erroneously finished and is history data of the identical process that is normally finished in another apparatus installed in the real environment, from history data of the other apparatus;
    extracting a difference between the history data of the erroneously finished process and the history data of the normally finished process; and
    suggesting a setting for normally finishing the process to the apparatus based on the extracted difference.

11. An information processing method comprising:
acquiring history data of a process performed by an apparatus installed in a real environment;
searching for history data that matches a content of a part of items included in history data of the process that is erroneously finished and is history data of the identical process that is normally finished in another apparatus installed in the real environment, from history data of the other apparatus;
extracting a difference between the history data of the erroneously finished process and the history data of the normally finished process; and
suggesting a setting for normally finishing the process to the apparatus based on the extracted difference.

* * * * *